United States Patent
Maeshima et al.

(10) Patent No.: US 10,329,644 B2
(45) Date of Patent: Jun. 25, 2019

(54) TA—NB ALLOY POWDER AND ANODE ELEMENT FOR SOLID ELECTROLYTIC CAPACITOR

(71) Applicant: ISHIHARA CHEMICAL CO., LTD., Kobe-shi, Hyogo (JP)

(72) Inventors: Takayuki Maeshima, Akashi (JP); Issei Satoh, Kobe (JP); Hisakazu Sakai, Akashi (JP); Jun Furutani, Takashima (JP); Yoshihiko Takata, Kobe (JP); Tsukasa Kondo, Tsuruga (JP)

(73) Assignee: ISHIHARA CHEMICAL CO., LTD., Hyogo (JP)

( * ) Notice: Subject to any disclaimer, the term of this patent is extended or adjusted under 35 U.S.C. 154(b) by 0 days.

(21) Appl. No.: 15/509,290

(22) PCT Filed: Sep. 11, 2014

(86) PCT No.: PCT/JP2014/074018
§ 371 (c)(1),
(2) Date: Mar. 7, 2017

(87) PCT Pub. No.: WO2016/038711
PCT Pub. Date: Mar. 17, 2016

(65) Prior Publication Data
US 2017/0283916 A1    Oct. 5, 2017

(51) Int. Cl.
*B22F 1/00*    (2006.01)
*C22C 27/02*   (2006.01)
(Continued)

(52) U.S. Cl.
CPC .......... *C22C 27/02* (2013.01); *B22F 1/00* (2013.01); *B22F 1/0018* (2013.01);
(Continued)

(58) Field of Classification Search
CPC .......... B22F 1/0018; B22F 1/0059; B22F 2003/242; B22F 2301/20; B22F 3/10;
(Continued)

(56) References Cited

U.S. PATENT DOCUMENTS 5,407,458 A    4/1995  Konig et al.
6,165,623 A    12/2000 Fife et al.
(Continued)

FOREIGN PATENT DOCUMENTS

EP    1 204 126 A1   5/2002
EP    1 340 235 B1   8/2006
(Continued)

OTHER PUBLICATIONS

Shimizu, Nobuhiro, "'Kondensa Yo Niobu Funmatsu' (Niobium Powder for Capacitor)', Kinzoku Materials Science & Technology, vol. 72, No. 3, pp. 221-226, 2002.
(Continued)

*Primary Examiner* — David Sample
*Assistant Examiner* — Elizabeth Collister
(74) *Attorney, Agent, or Firm* — Oliff PLC

(57) ABSTRACT

A Ta—Nb alloy powder which provides a capacitor having a higher capacitance than a Ta capacitor and a better thermal stability in terms of an oxide film than a Nb capacitor, the Ta—Nb alloy powder being a Ta—Nb alloy powder produced by a thermal CVD method, wherein a content of Nb is 1 to 50 mass %, and an average particle diameter of primary particles is 30 to 200 nm, preferably, a CV value per unit mass of the powder ($\mu F \cdot V/g$) is 250 k$\mu F \cdot V/g$ or more, or further, a CV value per unit volume ($\mu F \cdot V/mm^3$) in terms of a molded body whose molding density $\rho$ (g/cm$^3$) is $\rho_c$ (g/cm$^3$)=$-0.012 R_{Nb}+3.57$, wherein $R_{Nb}$:Nb content (mass %) in an alloy, is 900 $\mu F \cdot V/mm^3$ or more, and an anode element for a solid electrolytic capacitor using the alloy powder.

17 Claims, 3 Drawing Sheets

(51) Int. Cl.
*B22F 5/00* (2006.01)
*B22F 9/22* (2006.01)
*H01G 9/052* (2006.01)
*B22F 3/10* (2006.01)
*B22F 3/24* (2006.01)
*H01G 9/042* (2006.01)
*H01G 9/15* (2006.01)

(52) U.S. Cl.
CPC .............. *B22F 1/0059* (2013.01); *B22F 3/10* (2013.01); *B22F 3/24* (2013.01); *B22F 5/00* (2013.01); *B22F 9/22* (2013.01); *H01G 9/042* (2013.01); *H01G 9/052* (2013.01); *B22F 2003/242* (2013.01); *B22F 2301/20* (2013.01); *H01G 9/15* (2013.01)

(58) Field of Classification Search
CPC ... B22F 3/24; B22F 9/22; C22C 27/02; H01G 9/042; H01G 9/052; H01G 9/15
USPC .................................. 420/425, 427
See application file for complete search history.

(56) References Cited

U.S. PATENT DOCUMENTS

| | | | |
|---|---|---|---|
| 6,398,125 B1* | 6/2002 | Liu | ............... B05B 7/224 239/10 |
| 2002/0041819 A1 | 4/2002 | Kumar et al. | |
| 2004/0028922 A1 | 2/2004 | Reichert et al. | |
| 2004/0182199 A1 | 9/2004 | Naito | |
| 2008/0273292 A1* | 11/2008 | Sato | ............... B22F 1/0011 361/529 |

FOREIGN PATENT DOCUMENTS

| | | |
|---|---|---|
| EP | 1 144 147 B1 | 12/2008 |
| EP | 2 055 412 A3 | 9/2009 |
| JP | S64-73009 A | 3/1989 |
| JP | H02-310301 A | 12/1990 |
| JP | H06-25701 A | 2/1994 |
| JP | 2000-226607 A | 8/2000 |
| JP | 2002-206105 A | 7/2002 |
| JP | 2002-544375 A | 12/2002 |
| JP | 2004-052026 A | 2/2004 |
| JP | 2004-360043 A | 12/2004 |
| JP | 3624898 B2 | 3/2005 |
| JP | 2007-335883 A | 12/2007 |
| JP | 2008-101274 A | 5/2008 |
| JP | 4202609 B2 | 12/2008 |
| JP | 2009-007675 A | 1/2009 |
| JP | 4213222 B2 | 1/2009 |
| JP | 2009/275289 A | 11/2009 |
| JP | 4527332 B2 | 8/2010 |
| JP | 2010-265549 A | 11/2010 |
| WO | 98/37249 A1 | 8/1998 |
| WO | 00/67936 A1 | 11/2000 |
| WO | 02/11932 A1 | 2/2002 |

OTHER PUBLICATIONS

"Niobium Powder for Electrolytic Capacitor", JFE Technical Report, No. 8, pp. 63-65, Jun. 2005.

Krehl et al., "Sintering of Prealloyed Nb—Ta Powders for Use in Electrolytic Capacitors", Mod. Dev. Powder Metall., vol. 17, pp. 629-640.

Nov. 11, 2014 International Search Report issued in International Patent Application No. PCT/JP2014/074018.

Mar. 6, 2018 Extended European Search Report issued in Application No. 14901450.8.

Mar. 20, 2018 Office Action issued in Japanese Application No. 2016-547312.

\* cited by examiner

TA—NB ALLOY POWDER AND ANODE ELEMENT FOR SOLID ELECTROLYTIC CAPACITOR

TECHNICAL FIELD

The present invention relates to a Ta—Nb alloy powder suitable for use for the anode elements of small size and large capacitance solid electrolytic capacitors mainly used in electronic devices such as personal computers and cellular phones, and an anode element for a solid electrolytic capacitor using the alloy powder.

RELATED ART

A capacitor is one of electronic parts used in various electronic devices such as personal computers and cellular phones and basically has a structure in which a dielectric is sandwiched between two opposed electrode plates, and when voltage is applied thereto, charge is stored in each electrode by the polarizing action of the dielectric. There are a wide variety of capacitors, and currently, aluminum electrolytic capacitors, laminated ceramic capacitors, tantalum electrolytic capacitors, and film capacitors are mainly used.

In recent years, with reductions in size and weight and improvement of function of electronic devices, the above capacitors having a small size and a high capacitance have been required. Accordingly, the demand for a tantalum solid electrolytic capacitor (hereinafter also simply referred to as a "Ta capacitor") that is slightly expensive but has excellent characteristics such as a small size and a large capacitance, excellent high frequency characteristics, stability also in terms of voltage and temperature, and a long life has increased.

This Ta capacitor utilizes the fact that tantalum pentoxide ($Ta_2O_5$) that is an anodic oxide film of Ta is excellent as a dielectric, and is generally produced by a series of processes in which a Ta powder to be an anode raw material is compression-molded and sintered in a high vacuum to make a porous element, then the porous element is subjected to chemical conversion treatment (anodic oxidation treatment) to form an oxide film (amorphous $Ta_2O_5$ film) having excellent corrosion resistance and insulating properties, that is, a dielectric film, on the above Ta powder surface to form an anode, then a manganese nitrate solution is impregnated into the above porous element and thermally decomposed to form a $MnO_2$ layer (electrolyte) on the anodic oxide film to form a cathode, and finally, lead wires are connected with graphite, a silver paste, or the like followed by outer packaging with a resin or the like. Recently, those in which high frequency characteristics and large current characteristics are improved by using highly conductive polymer materials such as polypyrrole and polyaniline instead of the above $MnO_2$ have also been developed and put to practical use.

As an indicator for evaluating the electrical characteristics of a tantalum powder for a capacitor, generally, a CV value ($\mu F \cdot V/g$) that is the product of a capacitance and a chemical conversion voltage is used. The CV values of currently commercially available Ta powders are about 50 to 100 k$\mu F \cdot V/g$, and even the CV values of high capacitance products are only about 100 to 200 k$\mu F \cdot V/g$. Accordingly, the development of a tantalum powder for a capacitor having a higher CV value, specifically not less than 250 k$\mu F \cdot V/g$, is strongly desired.

The charge capacitance per unit voltage C that a capacitor can store is represented by $$C = (\varepsilon \cdot S)/t$$

wherein S: electrode area ($m^2$), t: the distance between the electrodes (m), c: the dielectric constant (F/m), $c = \varepsilon_s \cdot \varepsilon_0$, $\varepsilon_s$: the relative dielectric constant of the dielectric (oxide film of Ta: about 25), $\varepsilon_0$: the vacuum dielectric constant ($8.855 \times 10^{-12}$ F/m); and increases as the electrode area S increases, as the distance between the electrodes t decreases, and as the dielectric constant $\varepsilon$ increases. Therefore, in order to increase the CV value, it is necessary to increase the anode area S, that is, the surface area of the Ta powder constituting the anode, decrease the distance between the electrodes t, that is, the film thickness of the anodic oxide film $Ta_2O_5$, or utilize a material having a high dielectric constant $\varepsilon$.

In order to increase the surface area of the Ta powder, it is effective to decrease the primary particle diameter of the Ta powder. To this end, the primary particle diameter of the Ta powder has become finer with an increase in capacitance in recent years. However, there is a problem that when the primary particle diameter is decreased, the bonding portions (neck portions) of the metal particles become small when the Ta powder is sintered, and the bonding portions are broken by an oxide film formed by chemical conversion treatment, causing a decrease in capacitance. In addition, finer primary particles cause an increase in the content of gas components such as oxygen, nitrogen, and hydrogen and other impurity components adsorbed on the surfaces and therefore adversely affect characteristics as a capacitor. Therefore, the Ta powder desirably has a size at a certain level or more, specifically not less than 30 nm.

Currently, as methods for industrially producing Ta powders used in the above Ta capacitors, a Na reduction method in which $K_2TaF_7$ is reduced with Na (see Patent Document 1), a Mg reduction method in which $Ta_2O_5$ is reduced with Mg (see Patent Document 2), a grinding method in which a Ta ingot is hydrogenated and ground (see Patent Document 3), a thermal CVD method (gas phase reduction method) in which $TaCl_5$ is vaporized and reduced with $H_2$ (see Patent Documents 4 and 5), and the like are known. Among the above methods, the thermal CVD method described in Patent Documents 4 and 5 has an advantage of easily obtaining a fine Ta powder. Actually, many of Ta powders for capacitors currently used are produced by the Na reduction method (see Patent Document 6). However, the Na reduction method has a problem that it is difficult to efficiently produce a fine, high capacitance Ta powder.

The film thickness of the anodic oxide film can be adjusted by chemical conversion treatment voltage, but decreasing this film thickness causes various problems. For example, a crystalline natural oxide film having a thickness of several nm formed during powder production exists on the surface of the Ta powder. This oxide film often contains large amounts of impurities and is poor in quality and adhesiveness as a dielectric layer to decreases electrical characteristics. This problem does not particularly become apparent when chemical conversion treatment is performed at a high voltage because the oxide film is buried in the thick anodic oxide film. When the anodic oxide film is thin, however, the crystalline oxide film is exposed on the surface. Further, the reduction in the film thickness of the oxide film makes impurities adsorbed on the surface of the powder and film defects due to the impurities more apparent. As a result, the leakage current (LC) is increased, and the life of the capacitor is adversely affected. Therefore, there is a limit to the decrease of the film thickness of the anodic oxide film $Ta_2O_5$ for a larger capacitance.

In addition, Ta is a rare metal with small reserves and therefore is difficult to stably supply and expensive and also has large price fluctuations.

Therefore, the need for solid electrolytic capacitors using metals other than Ta is increased. Accordingly, the development and research of niobium solid electrolytic capacitors using inexpensive Nb with abundant reserves that has chemical and physical characteristics similar to those of Ta are promoted, and they are partly put to practical use (see, for example, Patent Documents 7 to 10 and Non Patent Documents 1 and 2).

PRIOR ART DOCUMENTS

Patent Documents

Patent Document 1: JP-A-2002-206105
Patent Document 2: JP-A-2002-544375
Patent Document 3: JP-A-H02-310301
Patent Document 4: JP-A-S64-073009
Patent Document 5: JP-A-H06-025701
Patent Document 6: JP-A-2007-335883
Patent Document 7: Japanese Patent No. 3624898
Patent Document 8: Japanese Patent No. 4213222
Patent Document 9: Japanese Patent No. 4527332
Patent Document 10: Japanese Patent No. 4202609

Non Patent Document

Non Patent Document 1: "Kondensa Yo Niobu Funmatsu (Niobium Powder for Capacitor);" KINZOKU MATERIALS SCIENCE & TECHNOLOGY, vol. 72 (2002) No. 3, p. 221-226
Non Patent Document 2: "Niobium Powder for Electrolytic Capacitor;" JFE TECHNICAL REPORT, No. 8 (June, 2005) p. 63-65

SUMMARY OF INVENTION

Task to be Solved by the Invention

The dielectric of a niobium solid electrolytic capacitor (hereinafter also referred to as a "Nb capacitor") is an oxide (niobium pentoxide $Nb_2O_5$) like a tantalum solid electrolytic capacitor (Ta capacitor) and has a dielectric constant of 41, about 1.5 times that of tantalum oxide $Ta_2O_5$, and therefore a CV value higher than that of the Ta capacitor is obtained. However, a problem of the above niobium oxide film is that it has a low thermal stability, and, for example, due to thermal stress in part mounting (reflow mounting), capacitance change and the deterioration of leakage current LC after the mounting occur, and therefore the niobium oxide film has not been widely adopted yet even after Nb capacitors have been put to practical use.

It is an object of the invention to provide a Ta—Nb alloy powder which provides a capacitor having a higher capacitance than a Ta capacitor and a better thermal stability in terms of an oxide film than a Nb capacitor, and an anode element for a solid electrolytic capacitor using the alloy powder.

Solution for Task

The inventors have studied diligently over and over for the solution of the above problem. As a result, it has been found that by using a Ta—Nb alloy powder produced by a thermal CVD method in which Nb content is controlled in an appropriate range as an anode raw material, an anode element for a solid electrolytic capacitor having a higher CV value per unit mass (μF·V/g) than a Ta capacitor and being excellent in the thermal stability in terms of an oxide film can be obtained, and thus the invention is accomplished.

The invention based on the above knowledge is a Ta—Nb alloy powder produced by a thermal CVD method, wherein a content of Nb is 1 to 50 mass %, and an average particle diameter of primary particles is 30 to 200 nm.

The Ta—Nb alloy powder of the invention is characterized in that a CV value per unit mass (μF·V/g) when an anode element is formed therefrom is not less than 250 kμF·V/g.

The Ta—Nb alloy powder of the invention is characterized in that a CV value per unit volume (μF·V/mm³) when an anode element is formed therefrom is not less than 900 μF·V/mm³, wherein the CV value is a value when an anode element whose molding density ρ (g/cm³) is $\rho_c$ defined by the following formula (1);

$$\rho_c(g/cm^3) = -0.012 R_{Nb} + 3.57 \quad (1)$$

wherein $R_{Nb}$:Nb content (mass %) in an alloy is formed therefrom.

The Ta—Nb alloy powder of the invention is characterized in that a leakage current when an anode element is subjected to reflow treatment of holding under an Ar atmosphere at 260° C. for 30 minutes after the anode element is formed is not more than 8 times a leakage current before the reflow treatment.

The invention is an anode element for a solid electrolytic capacitor using the Ta—Nb alloy powder according to any of the above.

Effect of the Invention

According to the invention, a Ta—Nb alloy powder suitable for use in a solid electrolytic capacitor having a higher CV value per unit volume and better oxide film characteristics than a Nb capacitor can be provided, which contributes greatly to a reduction in size and an increase in capacitance of electronic devices.

EMBODIMENTS FOR CARRYING OUT THE INVENTION

Figure 1:
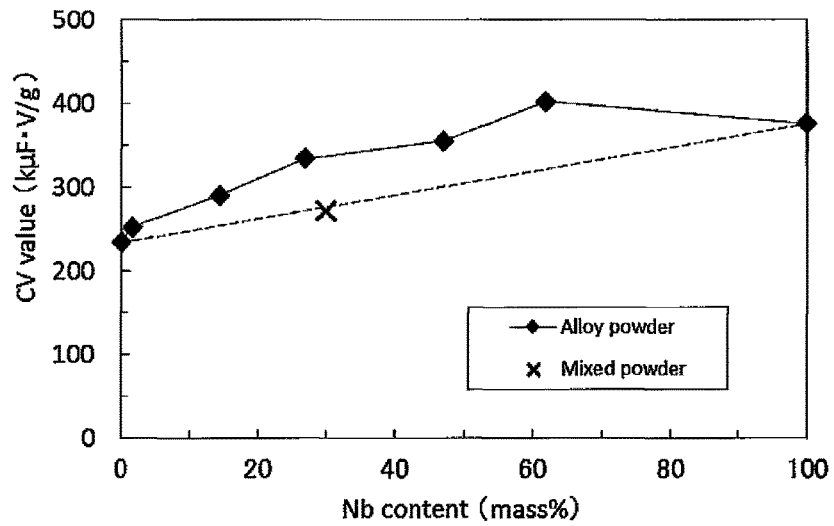
FIG. 1 is a graph showing the influence of a Nb content on a CV value per unit mass (μF·V/g) of Ta—Nb alloy powders.

First, it is important that the Ta—Nb alloy powder of the invention is produced by a thermal CVD method (gas phase reduction method) because as previously described, the thermal CVD method is suitable for producing a fine metal powder, and is the only method by which a fine Ta—Nb alloy powder can be stably produced at present, it is also easy to adjust alloy components, and an alloy having a narrow composition range can be produced. The specific method and conditions of the above thermal CVD method are not particularly limited, and, for example, a method disclosed in JP-A-2004-52026 can be preferably used.

Moreover, it is necessary that the Ta—Nb alloy powder (primary particles) of the invention has an average particle diameter in the range of 30 to 200 nm. When the average particle diameter is less than 30 nm, the strength of the bonding portions (neck portions) of the particles formed when the Ta—Nb alloy powder is sintered is weak, and the bonding portions are ruptured by an anodic oxide film formed by chemical conversion treatment, causing a decrease in conductivity and a decrease in capacitance. On the other hand, when the average particle diameter exceeds 200 nm, the primary particle diameter is too large, and therefore the surface area of the Ta—Nb alloy powder decreases, and it is difficult to stably ensure the target CV value (not less than 250 kμF·V/g). In order to stably achieve a high capacitance of not less than 250 kμF·V/g, the primary particles of the Ta—Nb alloy powder preferably have an average particle diameter in the range of 50 to 150 nm, more preferably in the range of 60 to 120 nm. Here, the average particle diameter of the above Ta—Nb alloy powder (primary particles) is a number-based average particle diameter when not less than 1000 particle diameters from a particle image taken by a scanning electron microscope SEM or the like are measured using image analysis type particle size distribution software (Mac-View manufactured by Mountech Co., Ltd.).

Next, it is necessary that the Ta—Nb alloy powder of the invention has a Nb content in the range of 1 to 50 mass %. Experiments that form the basis of the limitation will be described below.

Experiment 1

A Ta powder, a Nb powder, and Ta—Nb alloy powders in which the Nb content is variously changed (hereinafter the above three types of powders will be collectively referred to as "metal powders") are produced by a thermal CVD method. In the production of the above metal powders, the production conditions are adjusted so that the average particle diameter of the primary particles is within the range of 60 to 120 nm. Then, each of the above metal powders is pressure-molded into a pellet having a diameter of 3 mmφ and a length of 4 mm. At this time, the molding density ρ (g/cm$^3$) of the pellet after the above pressure molding is adjusted so as to fall in the range of ±0.10 g/cm$^3$ with respect to $\rho_c$ obtained from the following formula (1);

$$\rho_c = -0.012 R_{Nb} + 3.57 \quad (1)$$

according to the content of Nb in the Ta—Nb alloy, $R_{Nb}$, (mass %). Here, the molding density is a value excluding that of the wire.

Here, the reason why the molding density is adjusted as described above is as follows. The true densities of Ta and Nb differ greatly as Ta=16.69 g/cm$^3$ and Nb=8.57 g/cm$^3$, and therefore the true density of the Ta—Nb alloy powder varies depending on the composition. Therefore, the appropriate molding density (mass per unit volume) of the Ta—Nb alloy also varies depending on the composition, and as the content of Nb increases, the appropriate molding density decreases.

In fact, in the molding in the above experiment, when the molding density exceeded +0.20 g/cm$^3$ with respect to $\rho_c$ obtained from the above formula (1), cracks (fractures) are likely to occur after the molding or sintering, and conversely, when the molding density is less than −0.20 g/cm$^3$ with respect to $\rho_c$ obtained from the above formula (1), it is difficult to ensure strength as the molded body. More preferable molding density is in the range of ±0.10 g/cm$^3$ with respect to $\rho_c$ obtained from the formula (1).

Next, the pellet after the above molding is sintered under a vacuum atmosphere at a temperature of 900 to 1200° C. to form an anode element.

The above element is then subjected to chemical conversion treatment at a voltage of 10 V for 2 hour in a 0.05 mass % phosphoric acid solution having a temperature of 80° C. to form an anodic oxide film to be a dielectric on the metal particle surfaces, and thereafter the capacitance CV and the leakage current LC are measured in accordance with methods described in EIAJ RC-2361A. The capacitance CV is measured in a 40 mass % sulfuric acid solution at a voltage of 1V, a bias voltage of 1.5 Vdc, and a frequency of 120 Hz. For the measurement of the leakage current LC, a voltage of 7V is applied, and the leakage current after a lapse of 2 min is measured.

As reference, the capacitance CV and the leakage current LC are also measured with regard to a Ta—Nb mixed powder obtained by blending a Ta powder and a Nb powder so that the Nb content is 30 mass % under the same conditions as the above.

The measurement results are shown in Table 1. The leakage current is shown by a leakage current per unit capacitance (nA/μF·V).

TABLE 1

| No | Type of metal powder | Nb content (mass %) | Primary particle diameter (nm) | Molding density (g/cm$^3$) | CV value per unit mass (kμF · V/g) Before reflow | CV value per unit mass (kμF · V/g) After reflow | CV value per unit volume (μF · V/mm$^3$) Before reflow | CV value per unit volume (μF · V/mm$^3$) After reflow | Leakage current LC per unit capacitance (nA/μF · V) Before reflow | Leakage current LC per unit capacitance (nA/μF · V) After reflow | After reflow/ before reflow |
|---|---|---|---|---|---|---|---|---|---|---|---|
| 1 | Ta simple substance powder | 0 | 60 | 3.60 | 234 | 238 | 848 | 862 | 0.95 | 2.18 | 2.3 |
| 2 | Ta—Nb alloy powder | 1.7 | 71 | 3.62 | 252 | 259 | 913 | 935 | 1.01 | 2.35 | 2.3 |
| 3 | Ta—Nb alloy powder | 14.4 | 63 | 3.37 | 290 | 314 | 994 | 1069 | 1.30 | 5.62 | 4.3 |
| 4 | Ta—Nb alloy powder | 26.9 | 65 | 3.19 | 334 | 359 | 1068 | 1149 | 1.25 | 5.53 | 4.4 |
| 5 | Ta—Nb alloy powder | 47.1 | 80 | 3.01 | 355 | 427 | 1074 | 1293 | 1.13 | 7.90 | 7.0 |
| 6 | Ta—Nb alloy powder | 62.0 | 72 | 2.80 | 402 | 572 | 1128 | 1604 | 1.24 | 13.41 | 10.8 |
| 7 | Nb simple substance powder | 100.0 | 81 | 2.44 | 376 | 520 | 921 | 1273 | 2.10 | 22.05 | 10.5 |
| 8 | Ta—Nb mixed powder | 30.0 | 66 | 3.25 | 272 | 304 | 884 | 988 | 1.40 | 13.30 | 9.5 |

FIG. 1 shows a relationship between the Nb content and the CV value per unit mass (μF·V/g) in the above metal powders. As seen from the figure, the CV value of the element using the Nb powder (also referred to as the "Nb powder element") is about 1.6 times the CV value of the element using the Ta powder (also referred to as the "Ta powder element"), and the CV value of the element using the Ta—Nb mixed powder obtained by blending 30 mass % of a Nb powder in a Ta powder (also referred to as the "Ta—Nb mixed powder element") is substantially the same as a CV value obtained by interpolation from the CV values of the above Nb powder element and Ta powder element (also referred to as an "interpolated value"), whereas the CV values of the elements using the Ta—Nb alloy powders (also referred to as the "Ta—Nb alloy powder elements") are higher than the above CV value obtained by interpolation. Therefore, it is seen that the capacitances of the Ta—Nb alloy powder elements show capacitance characteristics different from those of the Ta powder element, the Nb powder element, and the Ta—Nb mixed powder element obtained by only mixing a Ta powder and a Nb powder. However, it is difficult to say that the CV values per unit mass (μF·V/g) of the above Ta—Nb alloy powder elements are better than that of the Nb powder element.

Figure 2:
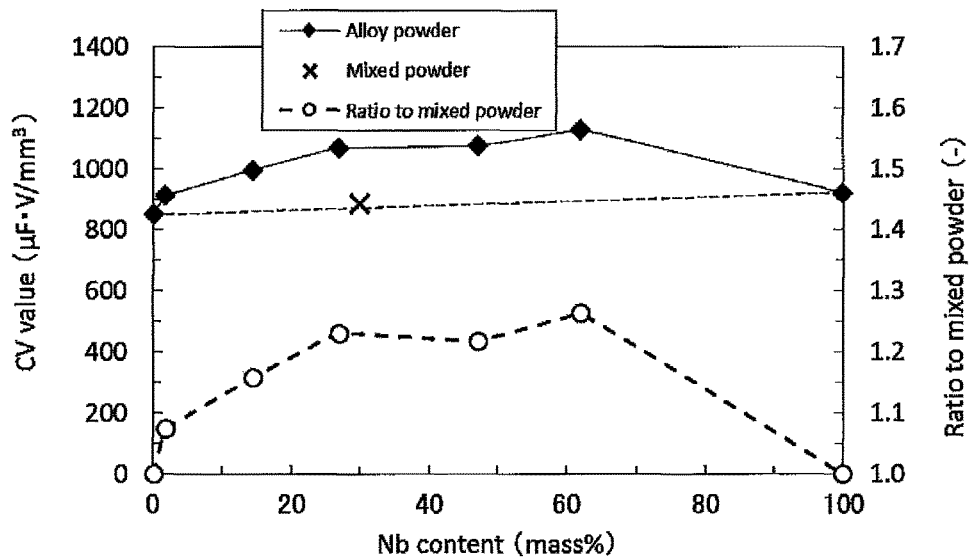
FIG. 2 is a graph showing the influence of a Nb content on a CV value per unit volume (μF·V/mm³) of Ta—Nb alloy powders.

On the other hand, FIG. 2 shows the CV values per unit mass (μF·V/g) in the above FIG. 1 converted into CV values per unit volume (μF·V/mm$^3$).

From this figure, the difference in the CV value per unit volume (μF·V/mm$^3$) between the Ta powder element and the Nb powder element is greatly reduced and is only a difference of a little less than 9%. This difference corresponds to a difference in capacitance when elements are made by filling each of a Ta powder and a Nb powder under the same conditions with a fixed volume size, and is practically an important indicator when a capacitor is designed. In addition, also in this case, the CV value of the Ta—Nb mixed powder element is on a straight line connecting the CV values of the Ta powder element and the Nb powder element and is the same as an interpolated value obtained from the CV values of the Nb powder element and the Ta powder element.

On the other hand, the CV values of the Ta—Nb alloy powder elements having a Nb content in the range of 14 to 62 mass % are about 17 to 30% higher than the interpolated value obtained from the CV values of the Nb powder element and the Ta powder element, and even for the Ta—Nb alloy containing only 1.7 mass % of Nb, a CV value higher than the interpolated value by as much as about 8% is obtained. From these, it is seen that the Ta—Nb alloys produced by the thermal CVD method show capacitance characteristics different from those of the powders of Ta and Nb simple substances, and the Ta—Nb mixed powder obtained by simply only mixing a Ta powder and a Nb powder and are materials with which capacitors having higher capacitance than conventional capacitors can be made.

Patent Document 10 of a conventional art discloses a Ta—Nb alloy having a Nb content of about 75 mass % and a primary particle diameter of about 400 nm produced by a Mg reduction method, and its CV value per unit mass is 290 kμF·V/g. This value is not less than 250 kμF·V/g but is only a value lower than the interpolated value of the Ta—Nb mixed powder having the same composition shown in FIG. 1. From this, it is considered difficult to produce a high capacitance Ta—Nb alloy powder by a method other than the CVD method.

A problem of the Ta—Nb alloy powders produced by the thermal CVD method is that they have poor fluidity due to being fine powders, but this point can be solved by the improvement of a granulation technique described later.

Figure 3:
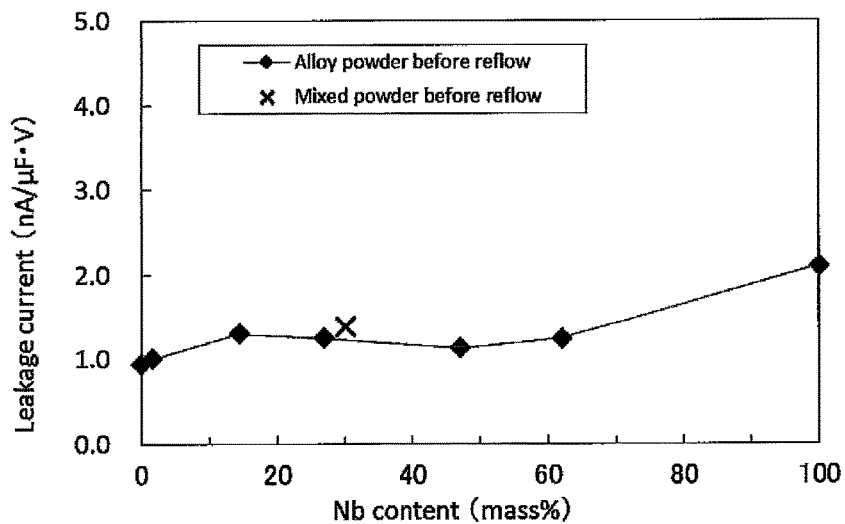
FIG. 3 is a graph showing the influence of a Nb content on leakage current of Ta—Nb alloy powders.

FIG. 3 shows the relationship between the Nb content and the leakage current LC of the above Ta powder element, Nb powder element, and Ta—Nb alloy powder elements. From this figure, the leakage current of the Nb powder element is about not less than 2 times that of the Ta powder element, that is, not less than 2.0 nA/μF·V, and is not preferable for a capacitor. But, it is seen that when the Nb content is not more than 62 mass %, the leakage current is hardly influenced by the Nb content and is at the same level. Moreover, the leakage current of the Ta—Nb mixed powder element is also shown in the figure for reference and is at the same level as that of the Ta—Nb alloy powder elements.

As seen from the above results, the Ta—Nb alloy powders having a Nb content in the range of 1 to 62 mass % produced by the thermal CVD method have a better CV value per unit volume (μF·V/mm$^3$) than the Ta powder, the Nb powder, and the Ta—Nb mixed powder and are anode materials suitable for a reduction in size and an increase in capacitance of capacitors.

Experiment 2

Next, in order to examine the thermal stability of the Ta—Nb alloy powders, the inventors examine changes in the CV value (μF·V/mm$^3$) and the leakage current LC by subjecting each of the elements after the chemical conversion treatment used in the above experiment to heat treatment at 260° C. for 30 minutes in an argon gas atmosphere in a simulation of reflow treatment during mounting. The CV value and the leakage current LC are measured under the same conditions as the above-described <Experiment 1>. Moreover, the Ta—Nb mixed powder is also similarly examined as reference.

Figure 4:
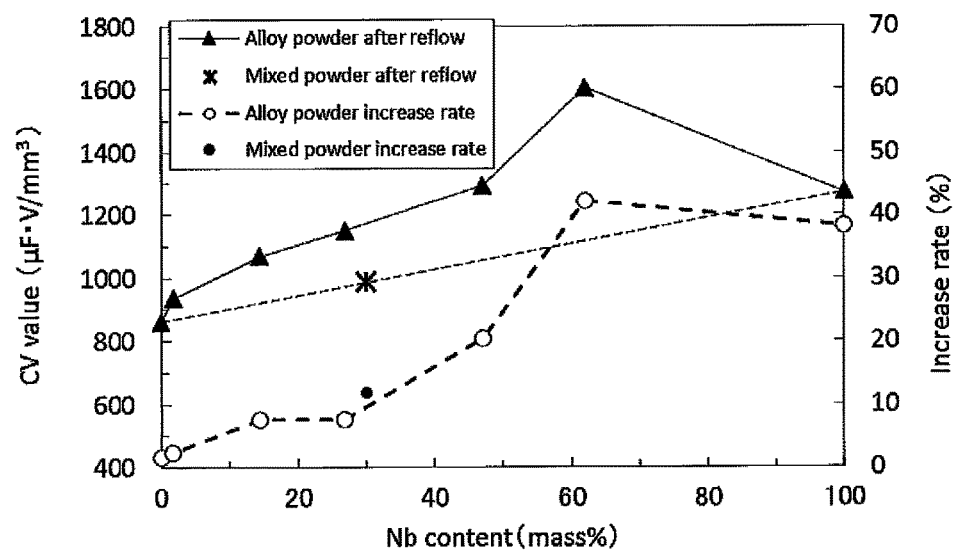
FIG. 4 is a graph showing the influence of reflow treatment on a CV value per unit volume (μF·V/mm³) of Ta—Nb alloy powders.

FIG. 4 shows the CV values per unit volume (μF·V/mm$^3$) before and after the reflow treatment in comparison. From this figure, the CV value per unit volume after the reflow treatment is increased with an increase in the content of Nb, and the increase rate (%) with respect to the CV value before the reflow treatment is about 20% when the Nb content is not more than 47 mass %. When the content of Nb is 62 mass %, however, it can be seen that the increase rate increases to close to 40%, the same as the Nb powder, and the thermal stability is poor. The CV value of the Ta—Nb mixed powder element after the reflow treatment is also on a straight line connecting the CV values of the Ta powder element and the Nb powder element and is the same as an interpolated value obtained from the CV values of the Nb powder element and the Ta powder element.

Figure 5:
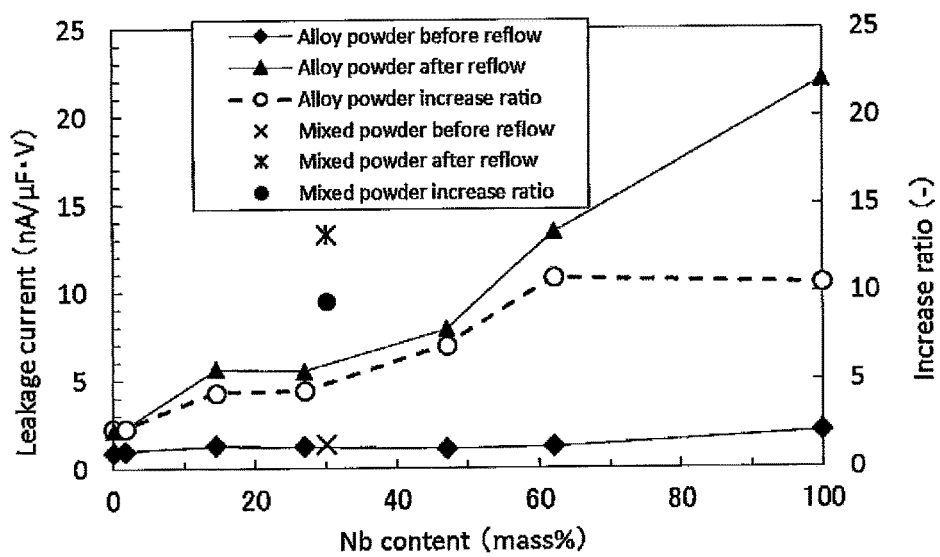
FIG. 5 is a graph showing the influence of reflow treatment on leakage current of Ta—Nb alloy powders.

Similarly, FIG. 5 shows the leakage current LC before and after the reflow treatment in comparison. It is seen that as described above, the influence of the Nb content is hardly recognized on the leakage current before the reflow treatment, while the leakage current after the reflow treatment increases greatly with an increase in the Nb content, and the increase ratio defined by (LC after the reflow treatment/LC before the reflow treatment) is not more than 8 when the Nb content is not more than 47 mass %, but the increase ratio is not less than 10 and deteriorates to the same level as that of the Nb powder when the Nb content is not less than 62 mass %. The leakage current of the Ta—Nb mixed powder element after the reflow treatment increases greatly compared with that of the Ta—Nb alloy powder elements, and the increase ratio deteriorates to the same level as that of the Nb powder element.

From the results of the above <Experiment 1> and <Experiment 2>, for the Ta—Nb alloy powder of the invention, the Nb content is set to be not less than 1 mass % from the viewpoint of setting the CV value per unit volume ($\mu F \cdot V/mm^3$) higher than an interpolated value obtained from the CV values of a Nb powder and a Ta powder, and the Nb content is limited to not more than 50 mass % from the viewpoint of making the deterioration of the capacitance CV and the leakage current LC due to reflow treatment smaller than that of a Nb powder. A preferable Nb content is in the range of 1 to 40 mass %.

The reason why the capacitance CV and the leakage current LC are increased when the Nb content is increased as described above is not sufficiently clear yet at present but is considered to be that a niobium oxide film $Nb_2O_5$ has a low thermal stability, and the oxygen in the niobium oxide film diffuses and disappears by reflow treatment, and the thickness of the oxide film forming the dielectric decreases, and due to the disappearance of the above oxygen, the oxide film thins, and film defects become apparent, and the insulating $Nb_2O_5$ changes to conductive NbO, and the like.

When a Ta—Nb alloy powder is used as the anode material of a capacitor, generally, the Ta—Nb alloy powder is compression-molded into the shape of an anode element by an automatic molding machine or the like. A Ta—Nb alloy powder (primary particles) produced by the thermal CVD method, however, has a fine particle diameter and a low bulk density as it is, and the gap is large, and therefore the density of the molded body to be an anode element is likely to be nonuniform. In addition, the Ta—Nb alloy powder has poor fluidity as it is, and therefore automatic charging into a molding die is difficult. Accordingly, it is important that the Ta—Nb alloy powder is granulated to improve fluidity before being used as an anode material.

The particles after the above granulation desirably have a fluidity within the range of 0.5 to 5 g/s as measured according to JIS Z2502 because when the above fluidity is less than 0.5 g/s, the fluidity is poor, and the amount of the particles introduced into a molding machine die is not stable, and therefore variations in anode element weight after compression molding increase, and on the other hand, when the fluidity exceeds 5 g/s, the particle diameter is too large, and it is difficult to obtain an anode element having uniform density by compression molding. Preferably, the fluidity is in the range of 1 to 4 g/s. The above fluidity in the invention is a value obtained by dividing a falling time (s) measured by a funnel having an orifice diameter of 2.63 mm by the mass (g) of the powder used in the measurement.

The Ta—Nb alloy powder (secondary particles) after granulation preferably has a size within the range of 10 to 500 μm in terms of a volume-based median diameter $d_{50}$ because when the $d_{50}$ is less than 10 μm, the fluidity and the moldability are worsened, and it is difficult to mold the Ta—Nb alloy powder, and on the other hand, when the $d_{50}$ exceeds 500 μm, it is difficult to uniformly fill a molding die with the Ta—Nb alloy powder, and therefore the molded body density is nonuniform. A more preferable median diameter $d_{50}$ is in the range of 15 to 300 μm. Here, the above volume-based median diameter $d_{50}$ is a value obtained by measuring a particle image taken at 100× magnification using a scanning electron microscope, using image analysis type particle size distribution software like the primary particles.

The Ta—Nb alloy powder (secondary particles) after granulation preferably has a powder bulk density in the range of 1.00 to 4.00 g/cm³ because when the powder bulk density is less than 1.00 g/cm³, it is difficult to increase the density of the molded body, and the capacitance per unit volume when an anode element is formed decreases, and on the other hand, when the powder bulk density exceeds 4.00 g/cm³, it is difficult to impregnate dioxide manganese $MnO_2$ or a conductive polymer material to be a cathode after sintering. A more preferable bulk density is in the range of 1.50 to 3.80 g/cm³. Here, the above powder bulk density in the invention refers to "loose bulk density" measured in accordance with JIS Z2504.

The method for obtaining a Ta—Nb granulated powder (secondary particles) from a Ta—Nb alloy powder (primary particles) produced by the thermal CVD method is not particularly limited as long as a granulated powder satisfying the above conditions is obtained. For example, a method in which an acrylic, polyvinyl alcohol (PVA), polyvinyl butyral (PVB), methyl cellulose, carboxyl cellulose, or the like is added as a granulating agent (binder) to Ta—Nb alloy particles and then the mixture is subjected to tumbling granulation by a rotary drum or the like, a high speed rotation granulation method, a fluidized bed granulation method, and a spray drying method can be used.

Also, a thermal granulation method in which a Ta—Nb alloy powder is granulated using inorganic matter such as water or a phosphoric acid aqueous solution as a binder, then heated and sintered, and ground, and then impurities such as oxygen are removed can also be appropriately used.

A granulated powder of a Ta—Nb alloy powder whose bulk density, particle size distribution, and median diameter are adjusted in appropriate ranges by the above various granulation methods is usually dry-molded, subjected to binder removal, fired, and then subjected to chemical conversion treatment to form an anode element. At this time, the molding density in dry molding may be appropriately selected according to the required electrostatic characteristics.

For the making of an anode element, a method of direct molding from a primary powder may be adopted without using the above dry molding process. For example, it is possible to add a binder and a solvent such as water to a primary powder, knead the mixture into kneaded clay, mold it into a sheet by an extrusion molding machine, then subject the sheet to binder removal, vacuum-fire the sheet, and then join wire by welding or the like to form an anode element.

EXAMPLES

Ta—Nb alloy powders (primary particles) having a Nb content of 30 mass % and an average particle diameter variously changed in the range of 20 to 250 nm as shown in Table 2 are produced by a thermal CVD method, then each of the above alloy powders is water-washed and dried, a cellulosic binder is added, and then the mixture is granulated using a rotary drum to form granulated particles (secondary particles) having a median diameter $d_{50}$ of 30 to 50 μm.

Then, a sintered element is made with the above granulated particles in accordance with test conditions of 100 kCV powder defined in Table 1 in the appendix to Standard of Electronic Industries Association of Japan EIAJ RC-2361A "Test methods of tantalum sintered anodes for electrolytic capacitors." At this time, the molding density of the element (pellet) is adjusted so as to fall within ±0.10 g/cm³ with respect to $\rho_c$ obtained by the above-described formula (1). Generally, the optimum sintering temperature of the element depends on the particle diameter and increases as the particle diameter increases, and therefore a preliminary experiment is performed in the temperature range of 950 to 1150° C., and the temperature obtaining the highest capacitance is adopted.

Then, the above element is subjected to chemical conversion treatment at a voltage of 10 V for 2 hour in a 0.05 mass % phosphoric acid solution having a temperature of 80° C. to form an anodic oxide film on the metal particle surfaces, and then the capacitance CV and the leakage current LC are measured in accordance with methods described in EIAJ RC-2361A. The capacitance CV is measured in a 40 mass % sulfuric acid solution at a voltage of 1 V, a bias voltage of 1.5 Vdc, and a frequency of 120 Hz. In addition, for the leakage current LC, a voltage of 7 V is applied, and leakage current after a lapse of 2 min is measured.

Further, the element after the above measurement is subjected to heat treatment simulating reflow treatment at 260° C. for 30 minutes in an Ar gas atmosphere, and the capacitance CV and the leakage current LC are measured under the same conditions as the above.

The results of the above measurement are shown together in Table 2. From these results, it is seen that a CV value per unit volume ($\mu F \cdot V/mm^3$) of not less than 900 $\mu F \cdot V/mm^3$ can be stably achieved by controlling the average diameter of the primary particles of the Ta—Nb alloy powder in the range of 30 to 200 nm.

5. The Ta—Nb alloy powder according to claim 1, wherein a leakage current when an anode element is subjected to reflow treatment of holding under an Ar atmosphere at 260° C. for 30 minutes after the anode element is formed is not more than 8 times a leakage current before the reflow treatment.

6. The Ta—Nb alloy powder according to claim 2, wherein a leakage current when an anode element is subjected to reflow treatment of holding under an Ar atmosphere at 260° C. for 30 minutes after the anode element is formed is not more than 8 times a leakage current before the reflow treatment.

7. The Ta—Nb alloy powder according to claim 3, wherein a leakage current when an anode element is subjected to reflow treatment of holding under an Ar atmosphere at 260° C. for 30 minutes after the anode element is formed is not more than 8 times a leakage current before the reflow treatment.

8. The Ta—Nb alloy powder according to claim 4, wherein a leakage current when an anode element is subjected to reflow treatment of holding under an Ar atmosphere at 260° C. for 30 minutes after the anode element is formed is not more than 8 times a leakage current before the reflow treatment.

TABLE 2

| No | Type of metal powder | Nb content (mass %) | Primary particle diameter | Molding density (g/cm$^3$) | Sintering temperature (° C.) | CV value per unit mass (k$\mu$F · V/g) Before reflow | CV value per unit mass (k$\mu$F · V/g) After reflow | CV value per unit volume ($\mu$F · V/mm$^3$) Before reflow | CV value per unit volume ($\mu$F · V/mm$^3$) After reflow | Leakage current LC per unit capacitance (nA/$\mu$F · V) Before reflow | Leakage current LC per unit capacitance (nA/$\mu$F · V) After reflow | After reflow/ Before reflow |
|---|---|---|---|---|---|---|---|---|---|---|---|---|
| 1 | Ta—Nb alloy | 30 | 25 | 3.12 | 950 | 160 | 172 | 496 | 534 | 1.25 | 5.6 | 4.5 |
| 2 | Ta—Nb alloy | 30 | 50 | 3.26 | 1000 | 341 | 367 | 1088 | 1171 | 1.28 | 5.8 | 4.5 |
| 3 | Ta—Nb alloy | 30 | 100 | 3.23 | 1050 | 318 | 342 | 1056 | 1136 | 1.20 | 5.6 | 4.7 |
| 4 | Ta—Nb alloy | 30 | 150 | 3.18 | 1100 | 301 | 324 | 1020 | 1097 | 1.14 | 5.1 | 4.5 |
| 5 | Ta—Nb alloy | 30 | 250 | 3.29 | 1150 | 225 | 242 | 810 | 871 | 1.05 | 5.0 | 4.8 |

The invention claimed is:

1. A Ta—Nb alloy powder produced by a thermal CVD method, wherein
a content of Nb is 1 to 50 mass %, and an average particle diameter of primary particles is 30 to 200 nm.

2. The Ta—Nb alloy powder according to claim 1, wherein a CV value per unit mass ($\mu F \cdot V/g$) when an anode element is formed therefrom is not less than 250 $\mu F \cdot V/g$.

3. The Ta—Nb alloy powder according to claim 1, wherein a CV value per unit volume ($\mu F \cdot V/mm^3$) when an anode element is formed therefrom is not less than 900 $\mu F \cdot V/mm^3$, wherein the CV value is a value when an anode element whose molding density $\rho$ (g/cm$^3$) is $\rho_c$ defined by the following formula (1):

$$\rho_c \text{ (g/cm}^3\text{)} = -0.012 R_{Nb} + 3.57 \quad (1)$$

wherein $R_{Nb}$: Nb content (mass %) in an alloy is formed therefrom.

4. The Ta—Nb alloy powder according to claim 2, wherein a CV value per unit volume ($\mu F \cdot V/mm^3$) when an anode element is formed therefrom is not less than 900 $\mu F \cdot V/mm^3$, wherein the CV value is a value when an anode element whose molding density $\rho$ (g/cm$^3$) is $\rho_c$ defined by the following formula (1):

$$\rho_c \text{ (g/cm}^3\text{)} = -0.012 R_{Nb} + 3.57 \quad (1)$$

wherein $R_{Nb}$: Nb content (mass %) in an alloy is formed therefrom.

9. An anode element for a solid electrolytic capacitor obtained from the Ta—Nb alloy powder according to claim 1.

10. An anode element for a solid electrolytic capacitor obtained from the Ta—Nb alloy powder according to claim 2.

11. An anode element for a solid electrolytic capacitor obtained from the Ta—Nb alloy powder according to claim 3.

12. An anode element for a solid electrolytic capacitor obtained from the Ta—Nb alloy powder according to claim 4.

13. An anode element for a solid electrolytic capacitor obtained from the Ta—Nb alloy powder according to claim 5.

14. An anode element for a solid electrolytic capacitor obtained from the Ta—Nb alloy powder according to claim 6.

15. An anode element for a solid electrolytic capacitor obtained from the Ta—Nb alloy powder according to claim 7.

16. An anode element for a solid electrolytic capacitor obtained from the Ta—Nb alloy powder according to claim 8.

17. The Ta—Nb alloy powder according to claim 1, wherein the content of Nb is 1 to 40 mass %.

* * * * *